(12) United States Patent
Jansheski

(10) Patent No.: US 7,278,453 B2
(45) Date of Patent: Oct. 9, 2007

(54) MODIFIED FUEL INLET RESTRICTOR

(75) Inventor: Glen R. Jansheski, Warren, MI (US)

(73) Assignee: Fluid Routing Solutions, Inc., Rochester Hills, MI (US)

(*) Notice: Subject to any disclaimer, the term of this patent is extended or adjusted under 35 U.S.C. 154(b) by 0 days.

(21) Appl. No.: 11/110,671

(22) Filed: Apr. 21, 2005

(65) Prior Publication Data

US 2005/0236068 A1  Oct. 27, 2005

Related U.S. Application Data

(60) Provisional application No. 60/564,312, filed on Apr. 22, 2004.

(51) Int. Cl.
*B65B 1/04* (2006.01)
(52) U.S. Cl. .................. 141/350; 220/86.2
(58) Field of Classification Search ............ 141/286, 141/301, 249, 350; 220/86.2
See application file for complete search history.

(56) References Cited

U.S. PATENT DOCUMENTS

| | | | |
|---|---|---|---|
| 3,730,216 A | 5/1973 | Arnett et al. |
| 3,835,900 A | 9/1974 | Godbier |
| 3,880,317 A | 4/1975 | Arnett |
| 3,911,977 A | 10/1975 | Berger |
| 4,034,784 A | 7/1977 | Ball et al. |
| 4,424,839 A | 1/1984 | Otani et al. |
| 4,529,097 A | 7/1985 | Larson |
| 4,679,698 A | 7/1987 | Thorn et al. |
| 4,733,791 A | 3/1988 | Sinclair |
| 5,212,864 A | 5/1993 | Bates et al. |
| 5,385,179 A | 1/1995 | Bates et al. |
| 5,439,129 A | 8/1995 | Buechler |
| 6,705,481 B2 | 3/2004 | Temmesfeld |

*Primary Examiner*—Steven O. Douglas
(74) *Attorney, Agent, or Firm*—Joseph V. Tassone; Thompson Hine LLP

(57) ABSTRACT

A fuel inlet assembly is provided for receiving fuel from a fuel-dispensing nozzle. The fuel inlet assembly has a filler pipe and a restrictor secured to the filler pipe. The restrictor has a diametrical opening. The assembly also has a protrusion that is attached to the restrictor and extends at an angle across a portion of the diametrical opening below the restrictor. The protrusion is made of an electrically conductive material and is sized, shaped, and positioned so as to contact the fuel-dispensing nozzle when the nozzle is inserted into the diametrical opening, thereby creating an electrical ground path between the nozzle and the fuel inlet assembly.

10 Claims, 4 Drawing Sheets

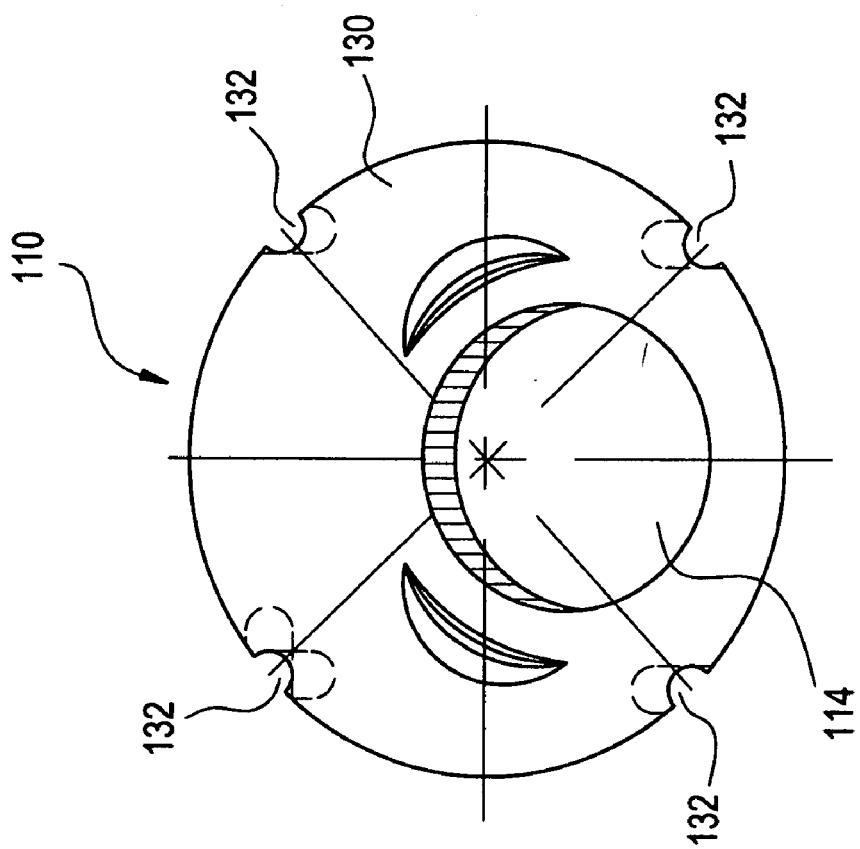

MODIFIED FUEL INLET RESTRICTOR

CROSS REFERENCE TO RELATED APPLICATION

This application relates to U.S. provisional patent application No. 60/564,312 filed on Apr. 22, 2004.

TECHNICAL FIELD

The present invention relates to fuel systems of motor vehicles, and more particularly, relates to fuel restrictors on fuel pipes of motor vehicles.

BACKGROUND

The standard fuel inlet assembly used on most vehicles today utilizes a biased flapper door to insure proper electrical grounding when a fuel-dispensing nozzle is inserted through the fuel inlet. Without proper grounding a dangerous condition might result in which static charge accumulates in the presence of volatile fuel vapors. Accordingly, the reliable creation of a ground path for a fuel-dispensing nozzle is a desirable safety feature for any fuel inlet assembly.

In a standard fuel inlet assembly 40, shown in FIG. 1, the flapper 42, which is normally closed, is pushed open as the nozzle 46 is inserted but remains in contact with the nozzle to provide a ground path. In the example shown in FIG. 1, the flapper 42 is spring biased in the closed direction by spring 44. Without the flapper 42 it is theoretically possible, given the dimensions of the standard inlet opening, that the nozzle 46 could be positioned in the inlet to dispense fuel without making contact to form a ground path.

A new fuel inlet assembly is desired that consistently and reliably forms a ground path when a nozzle is inserted but which can be manufactured more easily and at a lower cost than the standard fuel inlet assembly.

SUMMARY

A fuel inlet assembly is provided for receiving fuel from a fuel-dispensing nozzle. The fuel inlet assembly comprises a filler pipe that is fluidly connected to the fuel tank. The fuel inlet assembly further comprises a restrictor secured to the filler pipe. The restrictor has a diametrical opening, also referred to as a restrictor opening. A protrusion is attached to the restrictor and extends at an angle across a portion of the diametrical opening below the restrictor. The protrusion is made of an electrically conductive material and is sized, shaped, and positioned so as to contact the fuel-dispensing nozzle when the nozzle is inserted into the diametrical opening, thereby creating an electrical ground path between the nozzle and the fuel inlet assembly.

BRIEF DESCRIPTION OF THE DRAWINGS

These and other features, aspects, and advantages of the invention will become more readily apparent with reference to the following detailed description when read in conjunction with the accompanying drawings. The drawings referred to herein will be understood as not being drawn to scale, except if specifically noted, the emphasis instead being placed upon illustrating the principles of the invention. In the accompanying drawings:

FIG. 3 is a top view of the new fuel inlet assembly according to a second embodiment;

FIG. 4 is a cross sectional view of the fuel inlet assembly of FIG. 3; and

DETAILED DESCRIPTION

The new fuel inlet assembly eliminates the flapper door component of the standard design, such as used for unleaded gasolines, and utilizes instead a metal protrusion that interferes with and deflects the nozzle as it is inserted into the inlet. The protrusion is specially sized, shaped, and positioned to allow a standard nozzle to pass through the inlet easily, but with such a small clearance that metal-to-metal contact and, therefore, formation of an electrical ground path is inevitable. Through elimination of the separate flapper door component, the new fuel inlet assembly can be manufactured and assembled economically.

In addition to ensuring an electrical ground path, the metal protrusion of the new design may also be positioned and shaped so as to direct the nozzle and, therefore, the flow of fuel from the nozzle into a desirable location of the filler pipe to which the fuel inlet assembly is connected. For example, the protrusion may be positioned so as to deflect or "tip" the nozzle such that the centerline of the nozzle is aligned with the centerline of the filler pipe. In this manner, the problem of premature shutoff during fuel dispensing may be reduced or eliminated. In one embodiment the protrusion may be curved or tapered to steer the nozzle into alignment as it is inserted.

Figure 1:
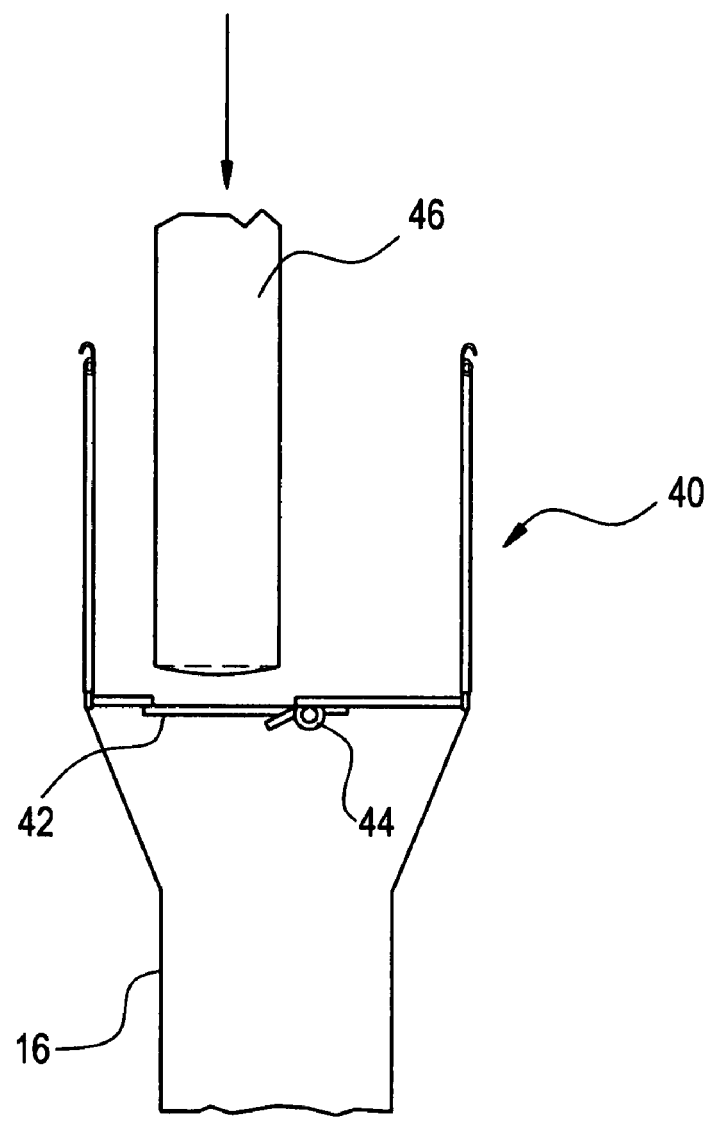
FIG. 1 is a cross sectional view of a prior art fuel inlet assembly located in a filler pipe.
Figure 2:
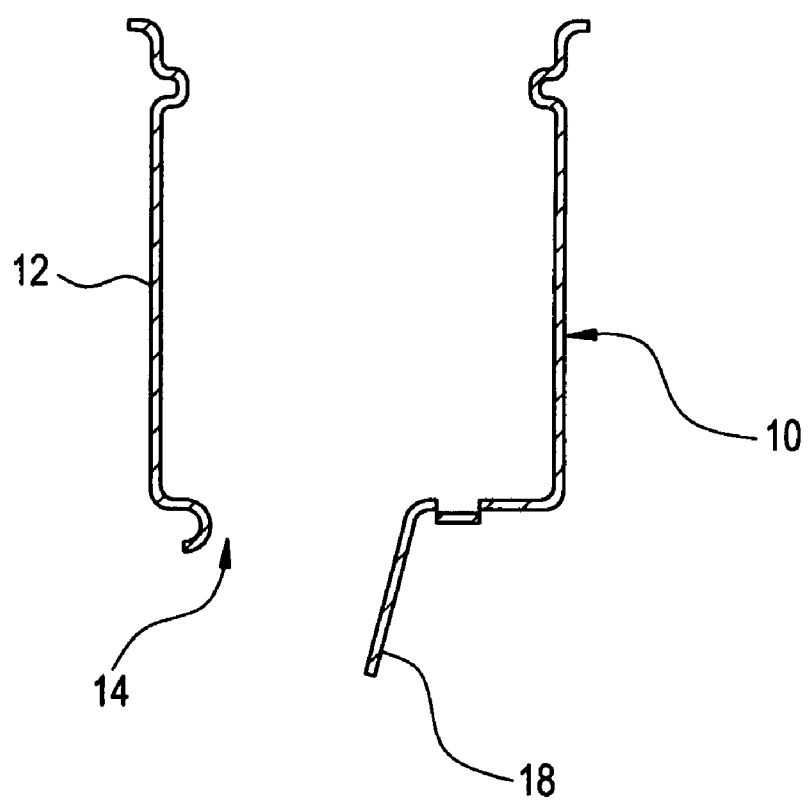
FIG. 2 is a cross sectional view of the new fuel inlet assembly according to a first embodiment.

Referring to FIG. 2, in one embodiment the fuel inlet assembly 10 comprises a hollow, cylindrical can 12 (also referred to as a restrictor) having an open top and a diametrical opening 14 in the bottom. The can 12 is dimensioned so as to fit within a filler pipe 16 of a vehicle and can be secured to the filler pipe 16 by any suitable means including welding or crimping. The height of the can 12 may be specifically selected so as to position the diametrical opening 14 at a desired depth into the filler pipe 16.

An angled protrusion 18 (also referred to as protrusion 18) partially obstructs the diametrical opening 14 in the bottom of the can 12 such that the protrusion 18 will contact a standard-sized fuel-dispensing nozzle to create an electrical ground path when such nozzle is inserted through the diametrical opening 14. In this regard, the diametrical opening 14 is sized to permit a standard fuel-dispensing nozzle to pass through the opening easily and without interference. The protrusion 18 is positioned near the perimeter of the diametrical opening 14 so as to further narrow the path through the diametrical opening 14 at increasing depths below the opening. The angle and dimensions of the protrusion 18 may be carefully selected to ensure that a standard fuel-dispensing nozzle, if passed through the diametrical opening 14, will inevitably come to rest against the protrusion 18. The protrusion 18 may be formed from any electrically conductive, substantially rigid or resilient material and may be, for example, rigidly attached to the can 12 by welding or may be unitarily formed therewith.

Figure 5:
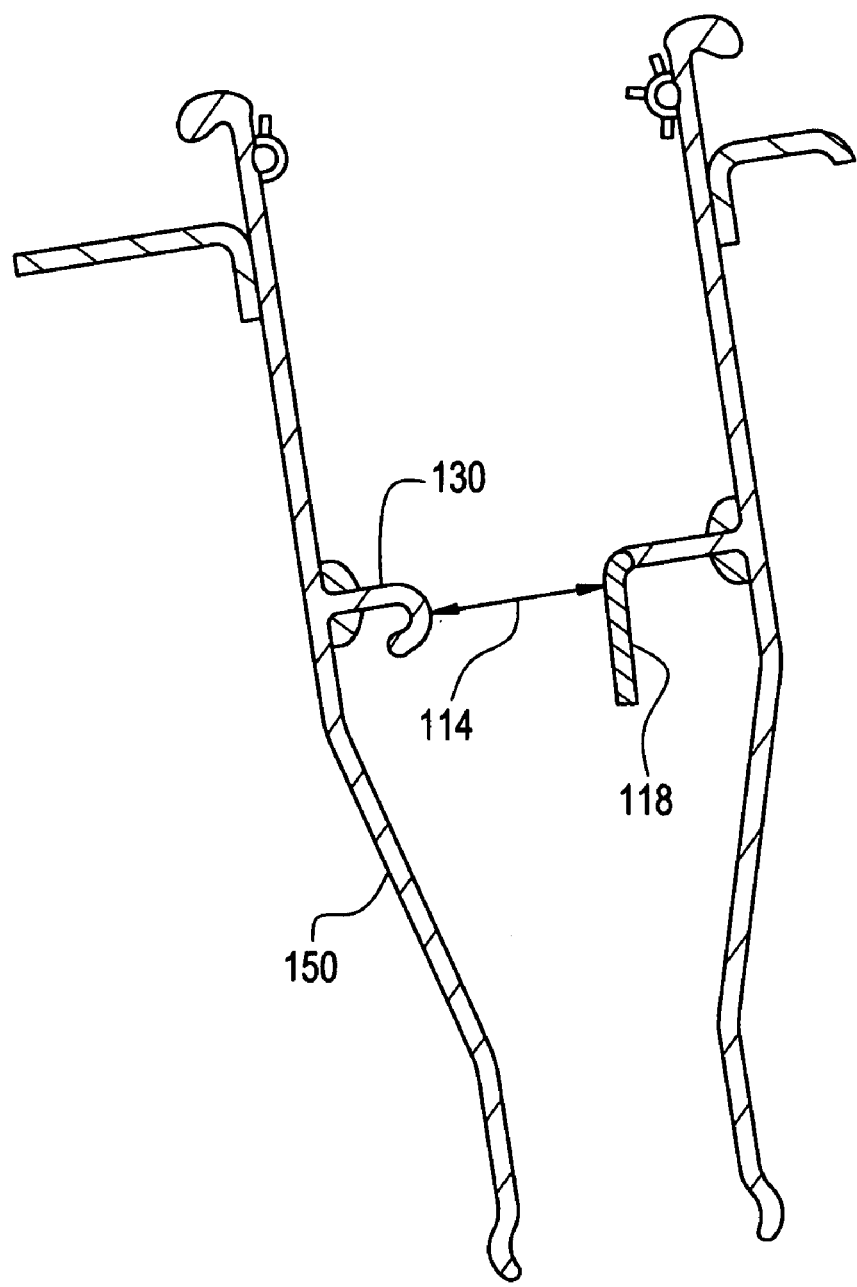
FIG. 5 is a cross sectional view of the fuel inlet assembly of FIG. 4 assembled within a filler pipe of a vehicle.

In a second embodiment, shown in FIGS. 3-5, the fuel inlet assembly 110 comprises a disc 130 (also referred to as the restrictor) having a diametrical opening 114 through its thickness. An angled protrusion 118 (or protrusion 118), identical to the angled protrusion 18 of the previous embodiment, extends from the underside of the disc 130 and partially obstructs the diametrical opening 114 such that the protrusion 118 will contact a standard-sized fuel-dispensing nozzle to create a ground path when such nozzle is inserted through the diametrical opening 114. Referring to FIG. 3, the disc 130, which is sized to fit within a filler pipe 150 of a vehicle, may include a plurality of notches 132 around its perimeter to assist in non-rotatably securing the disc 130 to the filler pipe 150. In particular, the disc 130 may be coupled to the filler pipe 150 at a desired depth within the filler pipe 150 by any suitable means including crimping, staking, or welding.

While the present invention has been illustrated by a description of several expressions, embodiments, methods, and examples, etc. thereof, it is not the intention of the applicants to restrict or limit the spirit and scope of the appended claims to such detail. Numerous other variations, changes, and substitutions will occur to those skilled in the art without departing from the scope of the invention. It will be understood that the foregoing description is provided by way of example, and that other modifications may occur to those skilled in the art without departing from the scope and spirit of the appended Claims.

What is claimed is:

1. A fuel inlet assembly for receiving fuel from a fuel-dispensing nozzle, the fuel inlet assembly comprising:
   a filler pipe;
   a restrictor secured to the filler pipe, the restrictor having a diametrical opening; and
   a protrusion rigidly attached to the restrictor and extending at an angle across a portion of the diametrical opening below the restrictor;
   wherein the protrusion is made of an electrically conductive, substantially rigid material and is sized, shaped, and positioned so as to without substantially deflecting contact the fuel-dispensing nozzle when the nozzle is inserted into the diametrical opening, thereby creating an electrical ground path between the nozzle and the fuel inlet assembly.

2. The fuel inlet assembly of claim 1, wherein the protrusion aligns the centerline of the fuel-dispensing nozzle with the centerline of the fuel pipe as the operator inserts the nozzle through the diametrical opening.

3. The fuel inlet assembly of claim 1, wherein the protrusion extends at an angle across the diametrical opening so as to narrow the path through the diametrical opening at increasing depths below the diametrical opening.

4. The fuel inlet assembly of claim 1, wherein the restrictor and the protrusion are each made of a steel and are joined together by welding.

5. The fuel inlet assembly of claim 1, wherein the restrictor and the protrusion are each made of a steel and are joined together by metal forming.

6. The fuel inlet assembly of claim 1, wherein the restrictor and the protrusion are unitarily formed from a steel.

7. The fuel inlet assembly of claim 1, wherein the restrictor is secured to the inside of the filler pipe by welding.

8. The fuel inlet assembly of claim 1, wherein the restrictor is secured to the inside of the filler pipe by crimping.

9. The fuel inlet assembly of claim 1, wherein the restrictor is a cylindrical can having an open top.

10. The fuel inlet assembly of claim 1, wherein the restrictor is a disc having a plurality of notches around its perimeter to assist in non-rotatably securing the disc to the inside of the filler pipe.

\* \* \* \* \*